United States Patent

Petersen

[15] 3,655,205
[45] Apr. 11, 1972

[54] ROTARY SEAL, PARTICULARLY FOR OIL PUMPS

[72] Inventor: Jorgen Hartvig Petersen, Nordborg, Denmark

[73] Assignee: Danfoss A/S, Nordborg, Denmark

[22] Filed: Nov. 3, 1970

[21] Appl. No.: 86,604

Related U.S. Application Data

[63] Continuation of Ser. No. 781,109, Dec. 4, 1968, abandoned.

[30] Foreign Application Priority Data

Jan. 16, 1967    Germany ...................... P 16 75 220.8

[52] U.S. Cl. ............................... 277/87, 277/74, 277/93 R, 277/41
[51] Int. Cl. ............................................................. F16j 15/34
[58] Field of Search .................... 277/40, 41, 85, 87, 81, 86, 277/89, 93, 96, 38, 39, 93 S, 93 D, 74

[56] References Cited

UNITED STATES PATENTS

| | | |
|---|---|---|
| 3,090,627 | 5/1963 | Tankus ..................................... 277/85 |
| 3,152,808 | 10/1964 | Tankus et al. ........................... 277/84 |
| 3,250,539 | 5/1966 | Kurz et al. ............................... 277/41 |
| 3,312,476 | 4/1967 | Eckerle et al. .......................... 277/87 |

FOREIGN PATENTS OR APPLICATIONS

1,442,188    5/1966    France ..................................... 277/82

Primary Examiner—Samuel B. Rothberg
Attorney—Wayne B. Easton

[57] ABSTRACT

The invention relates to a rotary seal unit of the type used for oil pumps and the like. A plastic backing ring having a tapered surface is nested in a conical recess of a face ring. The taper angle of the tapered surface of the backing ring is larger than the taper angle of the conical recess. A resilient sealing ring is spring biased to force the plastic backing ring into contact with the face ring which in turn is biased into sealing engagement with a fixed sealing surface of a stationary bearing block.

2 Claims, 1 Drawing Figure

Patented April 11, 1972          3,655,205
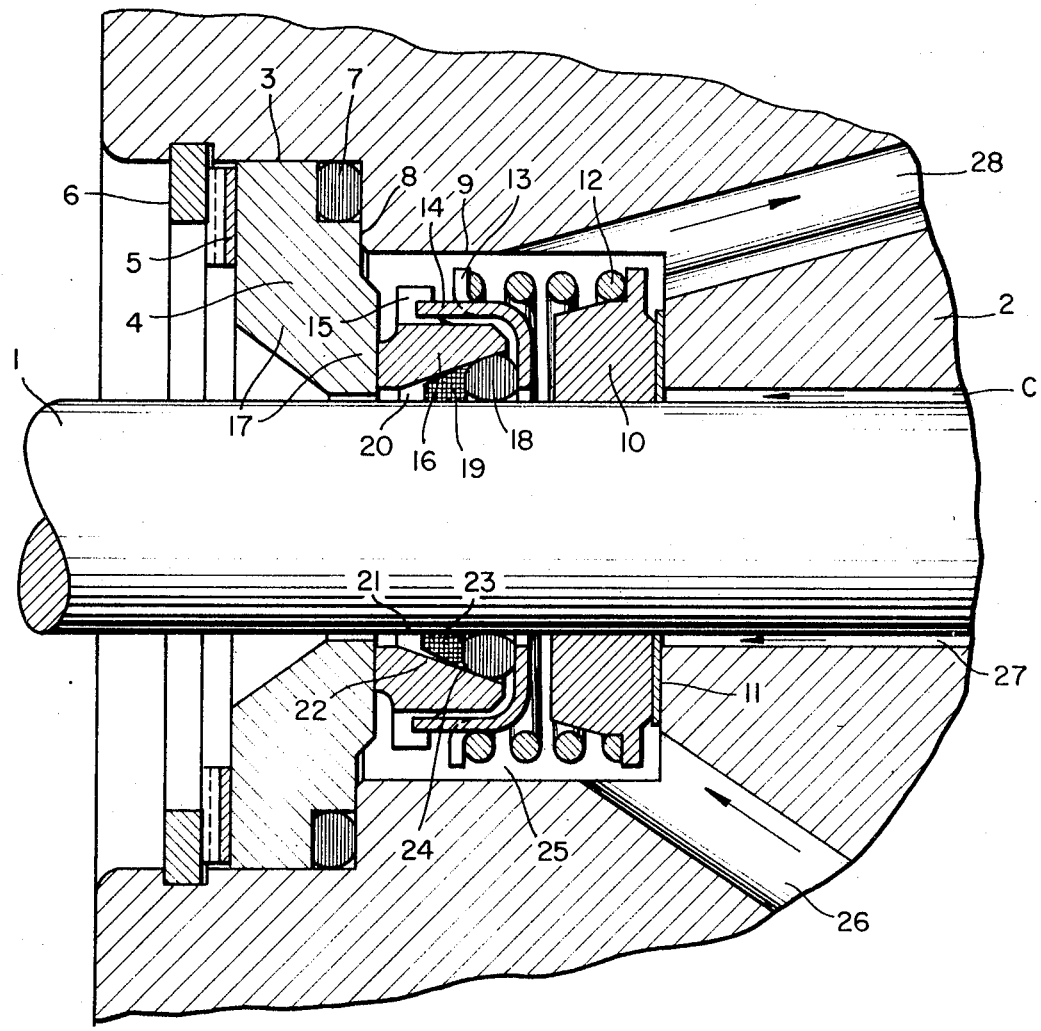

ROTARY SEAL, PARTICULARLY FOR OIL PUMPS

This application is a continuation of patent application, Ser. No. 781,109, now abandoned.

The invention relates to a rotary seal, particularly for oil pumps, the face ring of which seal is mounted by means of a resilient sealing ring on the machine part, relative to which it is axially displaceable, and is pressed against an axially fixed seal by means of a spring acting upon it through the sealing ring.

It is known to fit the sealing ring in a groove in the face ring, which groove faces the spring, and to load the sealing ring by means of a plate against which the spring bears. It has been found, however, that in various applications tightness in the region of the sealing ring diminishes after some time. This is particularly the case if the machine part is frequently displaced, relatively to the face ring, over axial lengths which are not just negligibly small. In the case of oil pumps, for example, it is undesirable for just one or two drops of oil per day to escape through the rotary seal.

The object of the invention is to provide a rotary seal with a resilient sealing ring which ensures a high degree of tightness over a very much longer operating period.

According to the invention, this object is achieved by the sealing ring being positioned between a tapered surface of the face ring and a cylindrical surface of the machine part and being pressed against a resilient backing ring, which bears against the machine part and likewise has a tapered surface.

A double seal is obtained in this way, since the backing ring also performs a sealing function. Backing ring and sealing ring are each pressed into the tapered cavity to an extent necessary to give a satisfactory degree of tightness. This means that any wear on the rings is automatically compensated. Here, it is of particular importance that the resilient sealing ring cannot be pressed into the tapered cavity to a random extent, since this cavity is blocked by the backing ring.

Expediently, the backing ring is made of a plastics material having less resilience than the sealing ring. The backing ring is thus enabled to limit movement of the sealing ring into the tapered cavity. Despite this, it is pressed with adequate force against the machine part, because of the transmission of force at the tapered surface. Considerable wear on the backing ring can here be accepted, since an automatic correction is made for any wear that occurs.

It is also advantageous if the tapered surface of the backing ring has a somewhat greater angle of slope than that of the tapered surface of the face ring. This ensures that the backing ring always completely blocks the tapered cavity with that of its end-faces presented to the sealing ring. No danger exists of the resilient sealing ring turning aside and moving past the backing ring into the tapered cavity. However, there occurs along the line of contact between the two tapered surfaces a very high pressure per unit of area, which reinforces the sealing action.

In a further form of the invention, the backing ring has sharp edges where it lies on the machine part. It then acts as a cleaning device which prevents dirt reaching the resilient sealing ring from the outside.

The invention will now be described in more detail by reference to an embodiment illustrated in the drawing. The drawing shows a longitudinal section through the rotary seal of an oil-pump bearing.

A shaft 1 is held in a bearing block 2. Inserted in a recess 3 in the bearing block is a seat ring 4, which is pressed against a pressure surface 8 by a strong corrugated spring washer 5, which is backed by a circlip 6, a resilient sealing ring 7 being interposed. The seat ring 4 defines a bore 9 in the bearing block 2.

Shrunk on to the shaft 1 is a pressure ring 10, at the rear side of which is located a floating bearing 11. Abutting the pressure ring is a spring 12 which is coiled in the same direction in which the shaft 1 rotates and the other end of which acts upon fingers on a plate 13, extensions 14 of which engage in recesses 15 in a face ring 16, so that these parts are linked to each other in such manner that they do not rotate relatively to each other. The face ring 16 forms a running surface 17 with the seat ring 4.

The plate 13 also acts upon a resilient sealing ring 18, which, together with a backing ring 19, is located in a cavity 20, which is defined by the cylindrical surface 21 of the circumference of the shaft and a tapered surface 22 on the face ring. In its undeformed condition, the sealing ring 18 is of circular cross-section. The backing ring 19 is bounded by two parallel end-faces, a cylindrical inner surface and a tapered outer surface 23, the angle of slope of which is greater than that of the tapered surface 22. Consequently, the edge 24 of the backing ring 19 bears on the tapered surface 22. The sealing ring 18 may be made of a resilient synthetic rubber, and the backing ring 19 of a plastics material having less resilience, e.g., polytetrafluoroethylene.

In operation, the sealing ring 18 is pressed by the plate 13 into the cavity 20, it bearing against the surfaces 21 and 22 and the backing ring 19. At the same time, the backing ring 19 is pressed into the cavity 20 and bears at the edge 24 against the surface 22. No harm occurs if some oil passes between the sealing ring 18 and the backing ring 19, since the latter still provides a satisfactory seal. If, however, the sealing ring 18 is mounted in oil on both sides, it undergoes only trifling wear, even if the shaft 21 is displaced axially to a considerable extent. That the backing ring 19 undergoes wear is of no importance, since this merely results in a slight axial displacement of the two rings 19 and 18.

For the sake of completeness, it may be mentioned that the chamber 25 in the bore 9 is filled with oil at low pressure, which is supplied by way of a bore 26 and lubricating passages 27 and the floating bearing 11, and is discharged to the suction side of the pump through a passage 28.

The equipment illustrated may also be used if the face ring has to be axially displaced relatively to the bearing block 2. In this case the tapered cavity 20 would be on the outer circumference of the face ring.

I claim:

1. A rotary seal unit for a rotatably shaft and casing assembly, comprising, a face ring surrounding said shaft and having an annular sealing surface for slidable and abutting engagement with a fixed surface on said casing, said face ring having a recess with a frustoconically shaped surface, a plastics material backing ring having an external frustoconically shaped surface with a larger taper angle than said face ring frustoconically shaped surface and with a sharp edge at the larger end thereof, said backing ring being disposed in said recess in surrounding and sealing engagement with said shaft, a resilient sealing ring having a circular section at least partly disposed in said recess and being in surrounding and sealing engagement with said shaft, means including spring means for resiliently biasing said sealing ring into abutting engagement with said backing ring and abutting engagement with said frustoconical surface of said face ring, said backing ring being biased by said sealing ring so that said backing ring sharp edge is in abutting engagement with said frustoconically shaped surface of said face ring.

2. A rotary seal unit according to claim 1 wherein said backing ring has annularly shaped planar end faces each extending in a direction normal to the axis of said shaft and forming a sharp edge immediately surrounding said shaft.

* * * * *